United States Patent Office 2,808,392
Patented Oct. 1, 1957

2,808,392

POLYAMIDES HAVING FURAN NUCLEUS OR TETRAHYDROFURAN NUCLEUS AND PROCESS FOR PRODUCING THE SAME

Yoshikazu Hachihama, Saidaiji, Fushimi-cho, Ikoma-gun, and Izumi Hayashi, Yata-kura, Nakakawachi-gun, Osaka, Japan No Drawing. Application July 23, 1953, Serial No. 369,947

Claims priority, application Japan April 1, 1953

2 Claims. (Cl. 260—78)

This invention relates to the production of polyamides by condensation-polymerization of furan-$\alpha,\alpha'$-dipropionic acid or tetrahydrofuran-$\alpha,\alpha'$-dipropionic acid with $\omega,\omega'$-diamines such as hexamethylene diamine or decamethylene diamine, and its object is to produce economically new synthetic fibres characterized by improved dyeing property, elasticity and other properties, or materials utilizable as plastics.

Furan-$\alpha,\alpha'$-dipropionic acid and tetrahydrofuran-$\alpha,\alpha'$-dipropionic acid can be produced from furfural and levulinic acid using them as starting materials by steps as shown by the following formulas:

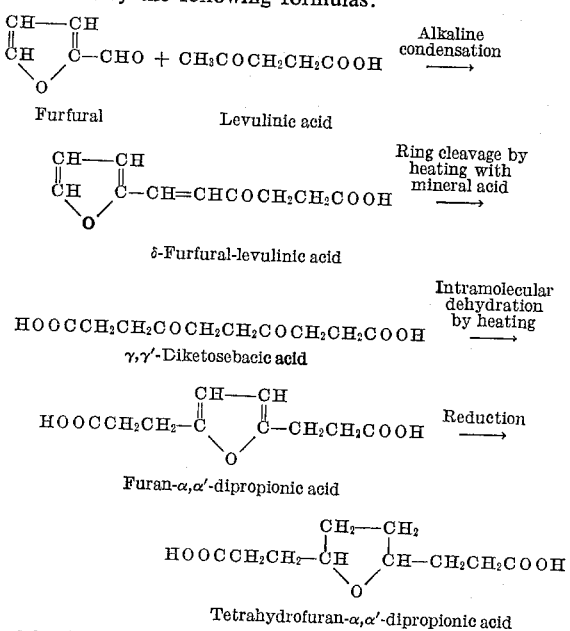

The inventors have studied and investigated in detail each reaction of the above mentioned formulas and have established for the first time a process in which especially weak alkali such a sodium carbonate is employed as catalyst in the initial condensation of furfural and levulinic acid and have found that the reduction of furan-$\alpha,\alpha'$-dipropionic acid to tetrahydrofuran-$\alpha,\alpha'$-dipropionic acid, when furan-$\alpha,\alpha'$-dipropionic acid is in the form of aqueous solution of alkali salt, can be progressed very easily by catalytic hydrogenation using Raney nickel catalyst. In every stage of the operations of the formulas, the yield is relatively high, the operation is simple, and no expensive secondary material is not necessary at all. Moreover, both furfural and levulinic acid used as starting materials, being degradation products of carbohydrates, can be obtained at a relatively low cost and abundantly from agricultural wastes or byproducts of industries.

Accordingly furan-$\alpha,\alpha'$-dipropionic acid and tetrahydrofuran-$\alpha,\alpha'$-dipropionic acid are dibasic acids which are available relatively economically.

It was disclosed recently in British Patent No. 627,733 that the polyamide produced by condensation-polymerization of paraphenylene dipropionic acid and decamethylene diamine has high Young's modulus and gives fibre suitable for tire cord. On the other hand, it is a fact already made known that the polyamides having ether linkage within the molecule are excellent in dyeing property by the polyamides such as those wherein triglycol diamine is employed (British Rayon and Silk Journal, vol. XXVI, No. 313, p. 52, 1950) or those wherein bis-3-amino-propyl ether is used (British Patent No. 615,954).

In the present invention, however, the polyamides are produced by condensation-polymerization of furan-$\alpha,\alpha'$-dipropionic acid or tetrahydrofuran-$\alpha,\alpha'$-dipropionic acid with $\omega,\omega'$-diamines, for example, with hexamethylene diamine, or decamethylene diamine. These new polyamides are characterized by the fact that the fibres produced thereof have high elasticity due to the heterocyclic structure within the molecule of the polyamides and they have specially high dyeing property when they have tetrahydrofuran nucleus. Moreover, these polyamides have lower melting points compared with the usual polyamide obtained from adipic acid and hexamethylene diamine and have various advantages in that they are easier to handle in molten spinning, moulding and other workings.

While as a method of condensation-polymerization of furan-$\alpha,\alpha'$-dipropionic acid or tetrahydrofuran-$\alpha,\alpha'$-dipropionic acid with diamine, heating of the salts of both materials in cresol is described in the following examples, but it is of course to be understood that any other method hitherto known for the production of polyamides by polymerization of dibasic acid such as adipic acid and diamine such as hexamethylene diamine, e. g., polymerization by adding water and heating under pressure or by heating under vacuum, etc., may also be applicable as the method for attaining said polymerization.

Example 1

After dissolving 2.117 g. of hexamethylene diamine and 3.653 g. of furan-$\alpha,\alpha'$-dipropionic acid in 20 cc. of alcohol respectively, the solutions are mixed and warmed for one hour in a hot water bath at 60–70° C. After cooling, a small quantity of ether is added to precipitate crystals. The crystals are filtered off and washed thoroughly with a mixture of ether and alcohol. The salt of hexamethylene diamine and furan-$\alpha,\alpha'$-dipropionic acid thus obtained has M. P. 181–182° C.

3 g. of the produced salt is dissolved in 4 cc. cresol, and is heated at 200–210° C. for 3 hours while passing nitrogen gas therethrough. When it is thrown, after cooling, into alcohol, polyamide is precipitated. The precipitate is filtered off and washed thoroughly with a mixture of alcohol and ether. The product has M. P. 185–190° C. and intrinsic viscosity 0.90 measured at 20° C. using metacresol as solvent.

Example 2

The solution of 45.1 g. of tetrahydrofuran-$\alpha,\alpha'$-dipropionic acid in 100 cc. of alcohol and the solution of 26.0 g. of hexamethylene diamine in 200 cc. of alcohol are mixed and the mixture is warmed for one hour in a hot water bath at 60–70° C. When a small quantity of ether is added after cooling, the salt of hexamethylene diamine and tetrahydrofuran-$\alpha,\alpha'$-dipropionic acid is precipitated as crystals. The precipitate is treated similarly as in the preceding example. Yield 68 g., M. P. 187–188° C.

20 g. of this salt is dissolved in 30 cc. of metacresol and is heated for 9 hours at 200–210° C. while passing nitrogen gas therethrough. The precipitate obtained is treated similarly as in the preceding example and polyamide having M. P. 182–184° C. and intrinsic viscosity 0.55 is obtained.

Example 3

The solution of 12.4 g. of tetrahydrofuran-α,α'-dipropionic acid in 50 cc. alcohol and the solution of 10.5 g. of decamethylene diamine in 100 cc. of alcohol are mixed and the mixture is warmed for 30 minutes in a hot water bath at 60–70° C. Thereafter it is treated in a similar way as in the preceding examples and 22.8 g. of salt of decamethylene diamine and tetrahydrofuran-α,α'-dipropionic acid is obtained. M. P. 141–142° C.

15 g. of this salt is dissolved in 20 cc. of metacresol and is heated for 9 hours and treated in a similar way as in the preceding examples. Polyamide having M. P. 175–178° C. and intrinsic viscosity 0.74 is obtained.

An example of the molten spinning of the polyamide thus obtained will be described in the following. 15 g. of polyamide having M. P. 175–178° C. and intrinsic viscosity 0.74 obtained from tetrahydrofuran-α,α'-dipropionic acid and decamethylene diamine is charged in a test tube of inner diameter of 1 cm. and the test tube is placed in an autoclave. Hydrogen gas of about 10 atmospheric pressure is introduced into the autoclave, and then it is heated at 200° C. for 30 minutes. The polyamide is made in a form of a candle and it is charged in an extruder type spinning apparatus. Spinning is carried out under the conditions of the spinning temperature of 178–180° C., the spinning rate of 25 metre/minute and the diameter of the nozzle of 0.5 mm. The fibre obtained is capable of being cold drawn, and when drawn to 350% of original length at room temperature, it shows the following results: denier number 146, tensile strength 3.1 g./denier and ultimate elongation 25%.

What is claimed is:

1. A process for producing a polyamide having a nucleus selected from the group consisting of furan and tetrahydrofuran which comprises the condensation-polymerization of a substance selected from the group consisting of furan-α,α'-dipropionic acid and tetrahydrofuran-α,α'-dipropionic acid with a substance selected from the group consisting of hexamethylene diamine and decamethylene diamine.

2. A polyamide having a nucleus selected from the group consisting of furan and tetrahydrofuran derived from the condensation-polymerization of a substance selected from the group consisting of furan-α,α'-dipropionic acid and tetrahydrofuran-α,α'-dipropionic acid with a substance selected from the group consisting of hexamethylene diamine and decamethylene diamine.

References Cited in the file of this patent

FOREIGN PATENTS

| 889,287 | France | Sept. 27, 1943 |
| 865,774 | Great Britain | Feb. 5, 1953 |

OTHER REFERENCES

Dunlop; "The Furanes," Rheinhold, 1953, page 590.